United States Patent [19]

Farnier

[11] 4,088,331
[45] May 9, 1978

[54] SEALING DEVICE BY CAPILLARITY

[76] Inventor: Andre Farnier, 76, rue d'Aguesseau, Boulogne, Hauts de Seine, France

[21] Appl. No.: 750,500

[22] Filed: Dec. 14, 1976

[51] Int. Cl.² .................. B65D 53/06; F16J 15/40
[52] U.S. Cl. .................................................. 277/135
[58] Field of Search ........................... 277/3, 29, 135

[56] References Cited

U.S. PATENT DOCUMENTS 3,763,971 10/1973 Saner .................................. 277/135

FOREIGN PATENT DOCUMENTS 1,265,007 5/1961 France .................................. 277/29

Primary Examiner—Herbert F. Ross
Attorney, Agent, or Firm—Seidel, Gonda & Goldhammer

[57] ABSTRACT

The object of the present invention concerns an improvement in a sealing device for an enclosure containing liquid necessarily connected by an opening of small cross-section with the outside and comprising a pressure balancing chamber.

3 Claims, 3 Drawing Figures

SEALING DEVICE BY CAPILLARITY

A device based on surface tension is already known for obtaining the sealing of an enclosure containing liquid and necessarily having an opening with a small cross-section communicating with the outside. In the said device it was necessary to add volume compensator. The volume compensator has a second opening in which the capillary tension of the liquid is smaller than the capillary tension at the first-mentioned opening.

This device operates perfectly when the two openings are at precisely the same pressure, so as not to interrupt the equilibrium created by the surface tensions in the capillary spaces.

Figure 1:
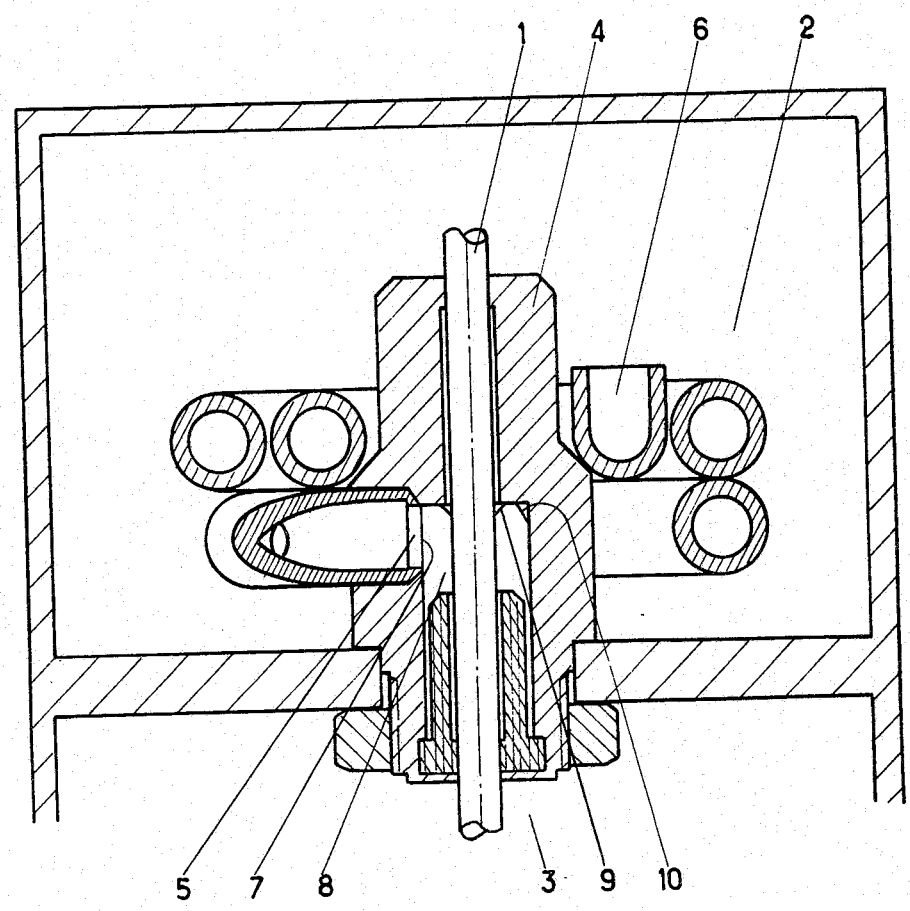

To obtain this result it is known to make the two openings issue into an isobaric space, that is to say a pressure balancing chamber. This device is shown in FIG. 1. It operates perfectly when the communicating opening connects the liquid in the enclosure to an external liquid. However, when the external element is a gas the device can only be used under certain conditions.

The hitherto produced isobaric chamber 8 is very narrow and it is therefore impossible to prevent the meniscus formed at the outlet of the first opening at 9 from being connected to the meniscus which necessarily forms at 10 so that, unbalanced in this way, the capillary system cancels out its action and creates a leak.

The object of the present invention is to improve the device and make it more universally usable.

The device comprises:

in a first embodiment the enlargement of the isobaric chamber in such a way that the meniscuses liable to form in the chamber cannot be connected and become identical with the meniscus of the first opening. The second opening is sufficiently remote from the first.

In a second embodiment the meniscus located on the first opening is forced to keep the minimum volume for a given loss of surface tension or variation in the capillary tension by the action of a gap which makes it possible for the meniscus of the first opening to be connected to the walls of the isobaric chamber.

The present invention will be described in greater detail with reference to the attached drawings, wherein show:

FIG. 1 a sectional view of a known sealing device.

Figure 2:
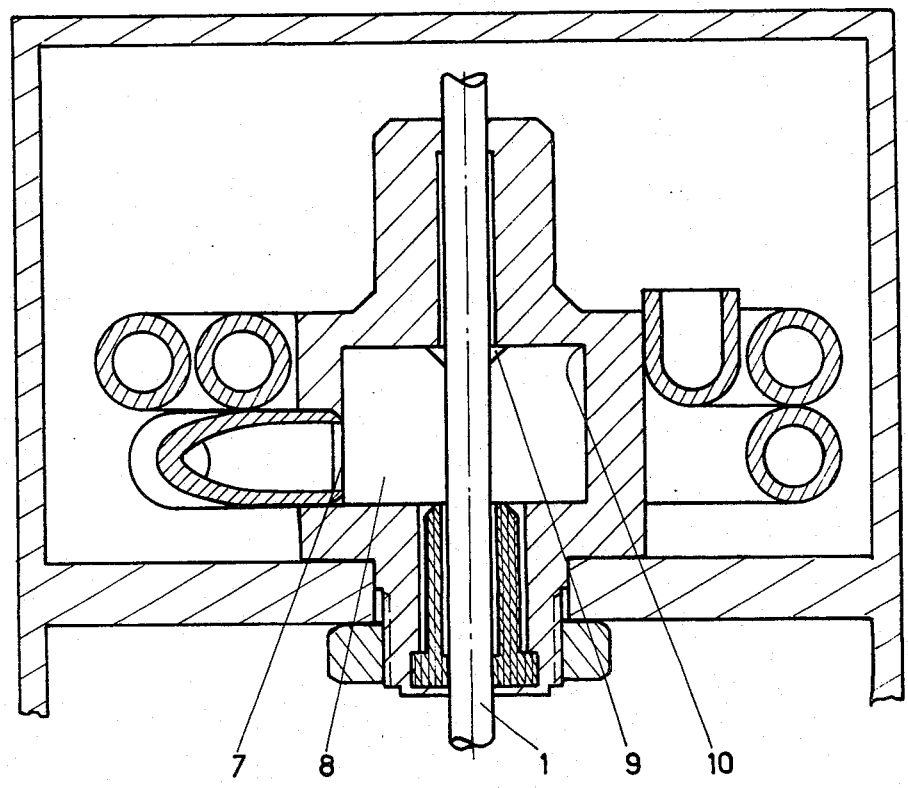

FIG. 2 a sectional view similar to FIG. 1 of a first embodiment of a sealing device according to the invention.

Figure 3:
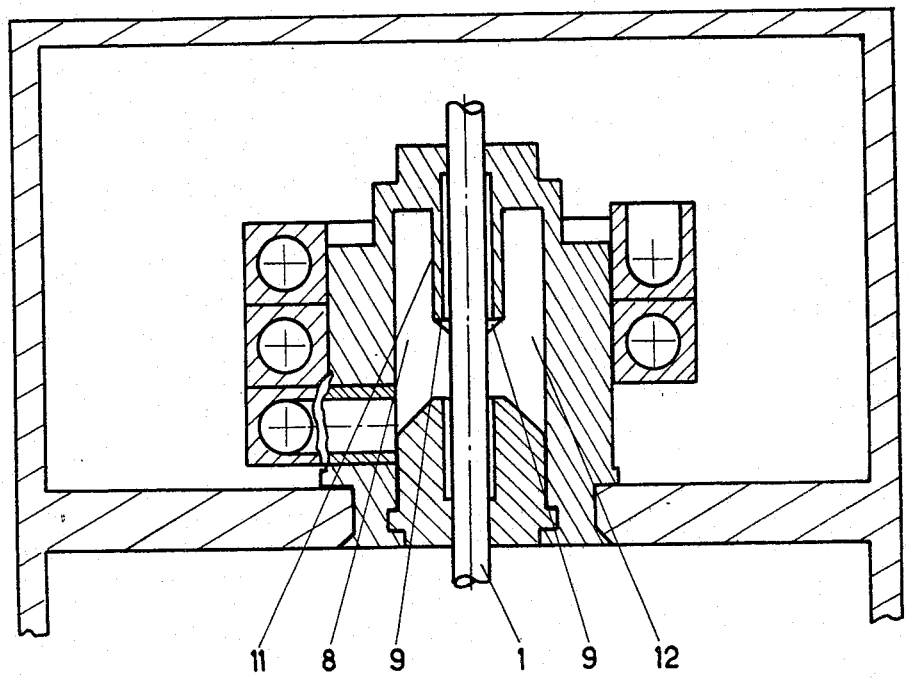

FIG. 3 a sectional view similar to FIGS. 1 and 2 showing a second embodiment of a sealing device according to the invention.

According to the embodiment of FIG. 1 the sealing device serves to permit the passage of a shaft 1 between a sealed enclosure 2 containing a liquid and the outside 3. The sealing device comprises a bearing 4 for shaft 1, a compensating tube 5 which serves to absorb any excess pressure or expansion of the liquid contained in enclosure 2. At an inlet port 6 the tube 5 connects with the enclosure and at 7 with an isobaric chamber 8 which serves to balance the pressures at the outlet 7 of the compensating tube and at the outlet 9 of the shaft. As a function of the pressure variations between the inside of enclosure 2 and the outside 3 a liquid column is formed which advances to a greater or lesser extent through tube 5.

The isobaric chamber 8 is directly connected with the outside 3.

When the outside 3 and therefore chamber 8 is filled with liquid the sealing device is completely satisfactory. However, when chamber 8 is filled with a gas the meniscus formed at the outlet of the shaft at 9 is connected to the meniscus which necessarily forms at 10, the space separating 9 and 10 being too small.

In the sealing device according to the invention the same reference numerals as hereinbefore are used to designate identical components.

FIG. 2 shows an embodiment in which the chamber 8 is sufficiently enlarged and the space between the meniscus of the first opening 9 and the possible meniscus 10 in the chamber cannot be connected.

The second or compensating opening 7 is sufficiently remote from the first opening 9, whilst its positioning also makes it possible to more easily empty the isobaric chamber.

FIG. 3 shows another embodiment. The outlet of the first opening 9 is extended by the effect of a tube 11 of small cross-section which creates a gap at 12 with the wall of chamber 8.

The meniscus formed at 9 at the outlet from the first opening is thus limited in its expansion perpendicular to the axis by the surface of the end of the tube, leading to an improvement in the capillary equilibrium system.

Obviously the invention is not limited to the embodiments described and represented hereinbefore and numerous variants are possible thereto without passing beyond the scope of the invention.

I claim:
1. In a sealing device comprising:
an enclosure containing a liquid;
a pressure balancing chamber having a top wall, a bottom wall, and a side wall between said top and bottom wall;
a tube communicating between said enclosure and said pressure balancing chamber;
said tube having an inlet port to said enclosure and an outlet port to said pressure balancing chamber;
said chamber having a first opening connecting said enclosure with the interior of said pressure balancing chamber and a second opening connecting said pressure balancing chamber with an environment exterior of said enclosure;
a shaft passing from the interior of said enclosure, through said first opening, into said pressure balancing chamber; the improvement comprising:
said outlet port being disposed adjacent said bottom wall; and
said side wall being disposed a sufficient distance from said first opening so that a meniscus of said liquid formed between said first opening and said shaft cannot contact a meniscus of said liquid that forms at the juncture of said side and top walls.

2. In a sealing device in accordance with claim 1 wherein said first opening exits into said pressure balancing chamber flush with said top wall of the pressure balancing chamber.

3. In a sealing device in accordance with claim 1 including a cylindrical projection extending downwardly from said top wall of the pressure balancing chamber and wherein said first opening is formed at least partially through said cylindrical projection and said first opening exits into said pressure balancing chamber at the lowermost end of said cylindrical projection.

* * * * *

UNITED STATES PATENT OFFICE
CERTIFICATE OF CORRECTION

PATENT NO. : 4,088,331
DATED : May 9, 1978
INVENTOR(S) : Andre Farnier

It is certified that error appears in the above-identified patent and that said Letters Patent are hereby corrected as shown below:

On the cover sheet, the following is added:

"[30]   Foreign Application Priority Data
         December 24, 1975   France ............... 75 39702"

Signed and Sealed this

Seventeenth Day of October 1978

[SEAL]

Attest:

RUTH C. MASON
*Attesting Officer*

DONALD W. BANNER
*Commissioner of Patents and Trademarks*